(12) United States Patent
Von Wendorff

(10) Patent No.: US 6,756,920 B2
(45) Date of Patent: Jun. 29, 2004

(54) CODING DEVICE, DECODING DEVICE, METHOD FOR CODING, AND METHOD FOR DECODING

(75) Inventor: Wilhard Christophorus Von Wendorff, München (DE)

(73) Assignee: Infineon Technologies AG, Munich (DE)

( * ) Notice: Subject to any disclaimer, the term of this patent is extended or adjusted under 35 U.S.C. 154(b) by 1 day.

(21) Appl. No.: 10/194,901

(22) Filed: Jul. 12, 2002

(65) Prior Publication Data

US 2003/0063017 A1 Apr. 3, 2003

(30) Foreign Application Priority Data

Jul. 12, 2001 (DE) .......................................... 101 33 934

(51) Int. Cl.[7] .............................................. H03M 7/00
(52) U.S. Cl. ............................ 341/50; 341/51; 341/67
(58) Field of Search ............................ 341/50, 51, 67, 341/106, 76; 375/240.14; 348/386.1; 382/246

(56) References Cited

U.S. PATENT DOCUMENTS

| | | | | |
|---|---|---|---|---|
| 4,562,468 A | * | 12/1985 | Koga ..................... | 375/240.14 |
| 5,043,728 A | * | 8/1991 | Hoshi et al. ................. | 341/106 |
| 5,319,457 A | * | 6/1994 | Nakahashi et al. ....... | 348/386.1 |
| 5,675,331 A | * | 10/1997 | Watanabe et al. ............. | 341/67 |
| 5,736,944 A | * | 4/1998 | Kurihara ..................... | 341/50 |
| 5,757,973 A | * | 5/1998 | Wilkinson et al. .......... | 382/246 |
| 6,195,764 B1 | | 2/2001 | Caldara et al. ................ | 714/30 |
| 6,351,501 B1 | | 2/2002 | Murdock ..................... | 375/292 |

FOREIGN PATENT DOCUMENTS

| | | |
|---|---|---|
| DE | 195 37 130 C2 | 4/1996 |
| DE | 199 27 751 A1 | 12/1999 |
| JP | 08 111 737 A | 4/1996 |

OTHER PUBLICATIONS

Anonymous: "FlexRay für verteilte Anwendungen im Fahrzeug" [FlexRay for diverse uses in a motor vehicle], *Elektronik Automotive*, May 2001, pp. 40–43.

H. Kopetz: "A Comparison of TTP/C and FlexRay", *Technical University Wien Research Report*, 2001/10, May 9, 2001, XP–002216066.

* cited by examiner

*Primary Examiner*—Jean Bruner Jeanglaude
(74) *Attorney, Agent, or Firm*—Laurence A. Greenberg; Werner H. Stemer; Ralph E. Locher

(57) ABSTRACT

A coding device is able to convert the data that is to be coded to data having different characteristics. The decoding device is able to decode differently coded data. The coding device utilizes measures to code the data according to various characteristics and protocols. Often the characteristics can be defined by state distributions. The decoding device can utilize information contained in the data to be decoded to characterize the data and define measures for decoding the data. Coding devices and decoding devices such as these can be used for widely differing applications.

44 Claims, 3 Drawing Sheets

CODING DEVICE, DECODING DEVICE, METHOD FOR CODING, AND METHOD FOR DECODING

BACKGROUND OF THE INVENTION

FIELD OF THE INVENTION

The present invention relates to a coding device for coding data, a decoding device for decoding data, and methods for coding and decoding data.

Coding devices are widely used. For example, coding devices convert digital data that is to be transmitted from a transmitter to a receiver, into a form that satisfies specific conditions.

Examples of these conditions follow:

that the coded data satisfies the conditions of a specific protocol: for example, the FlexRay protocol, the byteflight protocol, or the CAN protocol, that, on average, the coded data changes its level as rarely as possible (in order to minimize the high frequency components of the frequency spectrum of the coded and transmitted data stream, and/or the emitted electromagnetic radiation, and/or the crosstalk), that the coded data has a small DC signal component (for example, a small direct current component) in order to use appropriate bandpass filters to filter out low-frequency interference such as shot noise, resistance noise, etc., that the coded data has approximately the same number of bits at the high level as the number of bits at the low level in order to use transmitted data to obtain a DC signal component that can be used as a threshold value for data reconstruction, that the coded data does not remain at a specific level for too long, and/or that the coded data is at a specific level or has a specific level sequence at a specific time.

These widely differing requirements, some of which are even contradictory, for coding devices require different coding devices to be customized for different applications.

This is a major problem for both manufacturers and users.

Likewise, a corresponding situation applies to decoding devices.

SUMMARY OF THE INVENTION

It is accordingly an object of the invention to provide a coding device, a decoding device, a method for coding, and a method for decoding that overcome the hereinaforementioned disadvantages of the heretofore-known devices of this general type and that can be used for different applications.

With the foregoing and other objects in view, there is provided, in accordance with the invention, a coding device for coding data. The coding device includes means for converting data to be coded into different sets of coded data, wherein each set of coded data has different characteristics. Examples of structures of the means are defined in greater detail below.

With the objects of the invention in view, there is also provided a decoder including means for decoding various differently coded sets of data. Examples of structures of the means are defined in greater detail below.

With the objects of the invention in view, there is also provided a method for coding data. The method includes the step of converting data to be coded into coded data having characteristics by using a coder.

With the objects of the invention in view, there is also provided a method for decoding coded data. The method includes the step of converting coded data having characteristics into a data stream by using a decoder.

The coding device according to the invention is distinguished by its ability to convert the data that is to be coded into various sets of coded data, each set having different characteristics. Likewise, the decoding device according to the invention is distinguished by its ability to decode differently coded data, the differently-coded data having different characteristics.

The coding device and the decoding device can thus each be used for different applications.

Other features which are considered as characteristic for the invention are set forth in the appended claims.

Although the invention is illustrated and described herein as embodied in a coding device, a decoding device, and methods for coding and decoding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
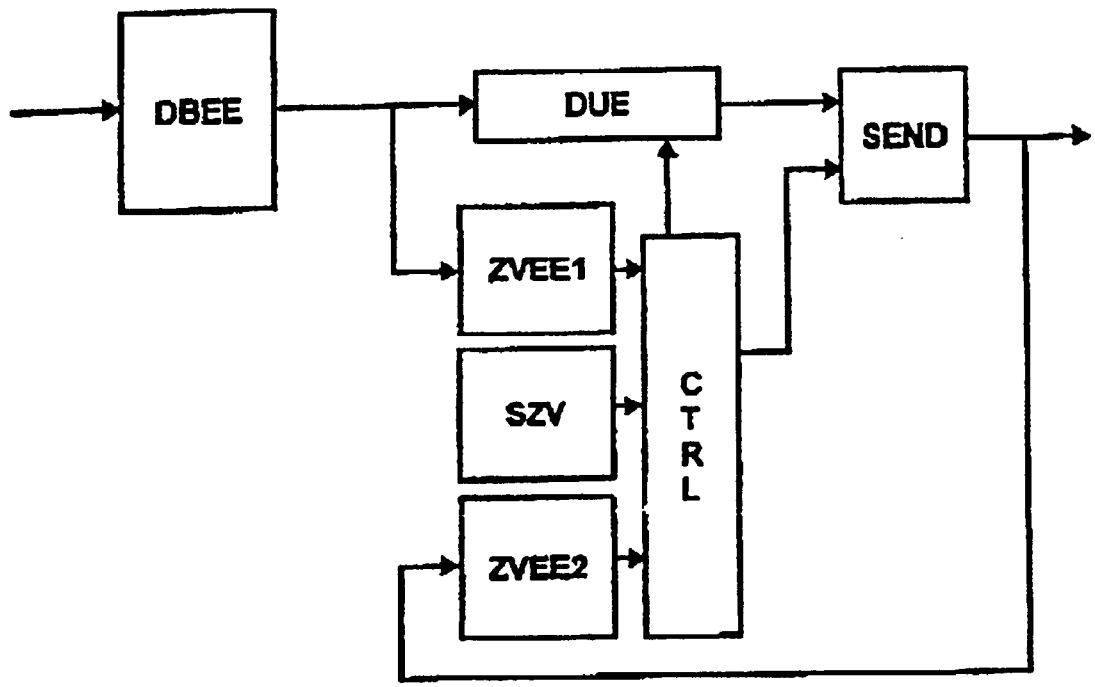
FIG. 1 is a schematic, block diagram showing a coding device according to the invention.

Referring now to the figures of the drawings in detail and first, particularly to FIG. 1 thereof, there is shown a coding device that is described in the following text. The coding device is distinguished by its ability to convert the data that is to be coded to data having different characteristics. In the process of converting, the characteristics can be varied by which the coded data is intended to have, or must have.

In the example under consideration, it is possible to vary the following:

the characteristics that the coded data has, the protocol by which the coded data is to be transmitted, the maximum possible level changes of the coded data, the minimum possible level changes of the coded data, the number of level changes per unit time of the coded data, the ratio of the number of bits at the high level that are contained in the coded data to the number of bits at the low level that are contained in the coded data, a specific value of the number of bits at the high level contained in the coded data or the number of bits at the low level contained in the coded data, the presence of bits at specific levels at specific points in the coded data, the bits or bit sequences having the desired characteristics, the measures for coding the data that is to be coded, and the source (i.e., the coding device itself or an outside source) of the measures used for coding.

The above list should not be regarded as an exhaustive statement of the selection options. In principle, any other desired selections, or additional selections, are also feasible.

The following are examples of the measures by which the coding device can ensure that the coded data has the desired characteristics, or that the characteristics of the coded data are as close as possible to the desired characteristics:

additional bits are inserted into the data that is to be coded, specific bits are set to the high level or to the low level, the data that is to be coded is subjected to logical and/or arithmetic operations, and the data that is to be coded is emitted without being changed.

In the example under consideration, the measure or the measures that the coding device uses to give the coded data the desired characteristics is or are selected based on state distributions. The state distributions indicate how many bits at the high level and how many bits at the low level are occurring within the data.

The state distributions on which the selection of the coding measure or measures to be used is based include the following:

a state distribution in which the data previously emitted by the coding device, or selected parts of this data, is taken into account, and at least one state distribution in which the data that has already been emitted by the coding device as well as the data that the coding device would emit if the data that is to be coded at that time were coded using one of the possible measures for this purpose, or selected parts of this data, are taken into account.

The coding measure to be conducted is selected as a function of a comparison. The comparison compares the (actual) state distributions with one another and/or with a reference state distribution.

Instead of the state distributions that indicate how many bits at the high level and how many bits at the low level exist within the data that is in each case to be taken into account in this process, comparable variables can be used in some circumstances. Examples of variables that can be used include the following: the ratio of the numbers of bits at the high level and at the low level and the difference between the numbers of bits at the high level and at the low level. Likewise, the same applies to the decoding device, which is described below.

In certain situations, the coding measures to be used could also be selected by accounting exclusively for the data that has already been coded, or by accounting exclusively for the data that is to be coded.

FIG. 1 shows the construction of a coding device that is constructed and operates as described in general form above.

The coding device that is illustrated in FIG. 1 contains a data block production device DBEE, a first state distribution determination device ZVEE1, a memory device SZV, a second state distribution determination device ZVEE2, a control device CTRL, a data conversion device DUE, and a transmission device SEND. The following steps are performed in the coding device:

the data block production device DBEE breaks the data, which is supplied to the coding device in the form of a data stream and is to be decoded, into data packets; then, the data block production device DBEE passes these data packets to the data conversion device DUE and to the first state distribution determination device ZVEE1, for the received data or selected parts of it, the first state distribution determination device ZVEE1 determines the state distribution (i.e., the number of bits at the high level and the number of bits at the low level) and passes this state distribution to the control device CTRL, the memory device SZV stores the already-mentioned reference state distribution of the coded data and passes it to the control device CTRL, with this reference state distribution being entered via an input device, which is not shown in FIG. 1, or being determined from data which is entered via the input device, for the data that is emitted from the coding device or for selected parts of it, the second state distribution determination device ZVEE2 determines the state distribution (i.e., the number of bits at the high level and the number of bits at the low level) and passes this state distribution to the control device CTRL, based on the information that is supplied to it, the control device CTRL performs the following:

determines the measures that must be used to code the data, drives the data conversion device DUE appropriately, and produces indication data, which indicates the measurements that have been used to code the relevant data block, and supplies this indication data to the transmitting device SEND, the data conversion device DUE codes the data blocks that are supplied to it in accordance with the requirements from the control device CTRL, and passes them to the transmitting device SEND, the transmitting device SEND integrates the indication data that is supplied to it into the data that is supplied to it from the data conversion device DUE, and emits this data as the coded data from the coding device and, furthermore, supplies it to the second state distribution determination device ZVEE2.

Figure 2:
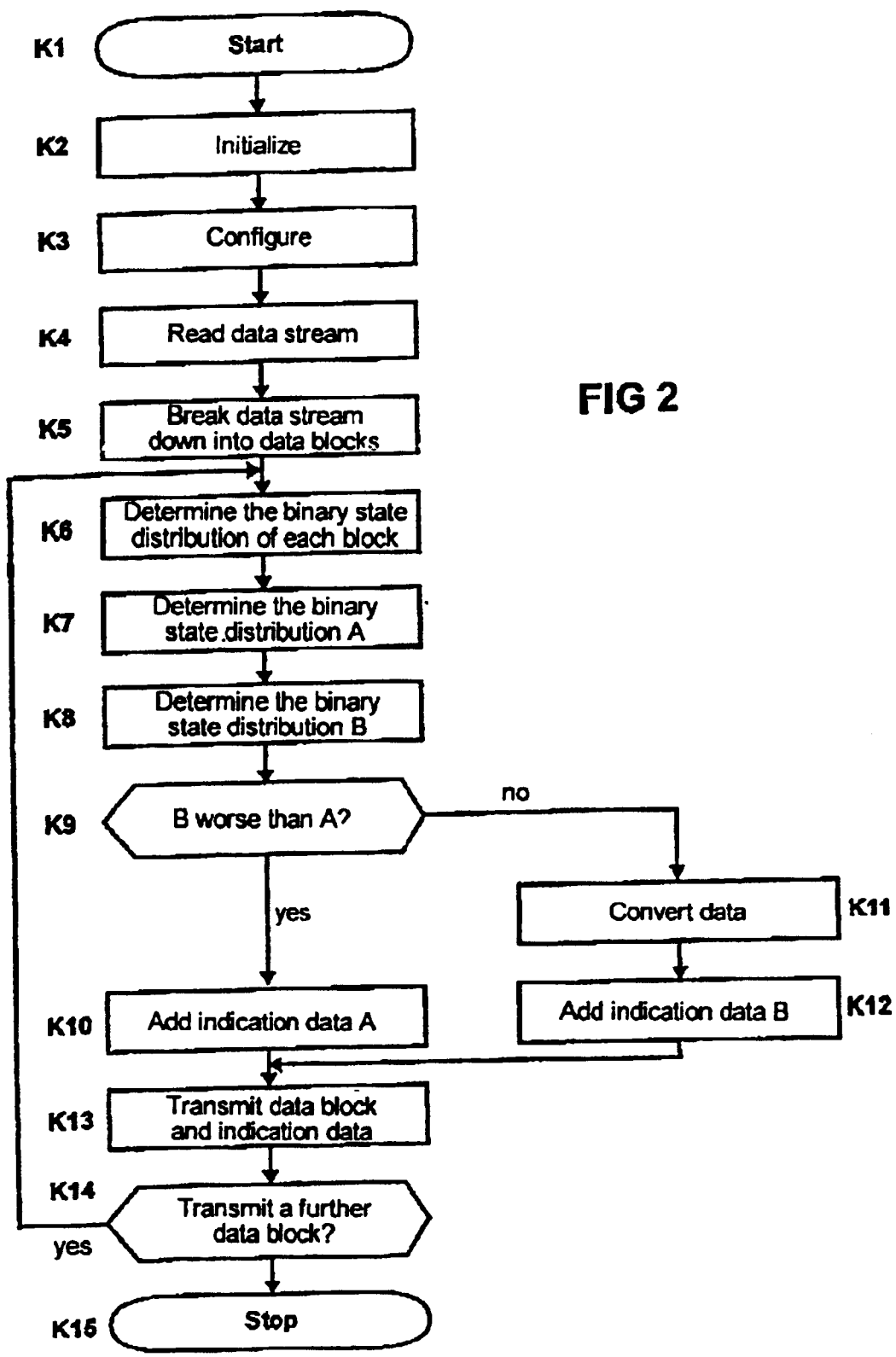
FIG. 2 is a flowchart showing a method of operating the coding device shown in FIG. 1.

The coding device that is shown in FIG. 1 operates as illustrated in the flowchart shown in FIG. 2.

After the start, that is to say, by way of example, after startup or after resetting of the coding device (step K1), this coding device is initialized (step K2).

Data that is used for configuration of the coding data is then entered (step K3). In the example under consideration, this data contains the following information:

the number of bits that each of the data blocks that are to be produced in step K4 is intended to contain, the parts (bits) of the respective data for which the state distribution determination, which is to be carried out in steps K6, K7 and K8, should be produced, the reference state distribution of the data or of selected parts of it, whether the emitted data is intended to include indication data and where, if appropriate, such data is intended to be located, and whether the control device CTRL should drive the data conversion device DUE as a function of the reference state distribution of the various actual state distributions and/or of other or further information.

In the example under consideration, the reference state distribution is the desired state distribution; however, it may also be a state distribution that is expressly not desired, or some other state distribution.

After this (step K4), the coding device can receive the data that is to be coded. To be more precise, the coding device receives a data stream that is to be coded.

The received data stream is broken down into data blocks by the data block production device DBEE (step K5).

The first state distribution determination device ZVEE1 then (step K6) determines the state distribution for these data blocks. To be more precise, the first state distribution device ZVEE1 determines the state distribution for the bits in the data blocks that are defined in the configuration (step K3). The state distribution that is determined in step K6 may be of assistance (but need not be) in the state distribution determination process that is conducted in step K8.

The second state distribution determination device ZVEE2 then (step K7) determines the overall state distribution for the data blocks that have already been coded and have been emitted. To be more precise, the second state distribution determination device ZVEE2 determines the overall state distribution for the bits of these data blocks that were defined in the configuration (step K3). The state distribution that is determined in step K7 is then referred to as the state distribution A.

The control device CTRL then (step K8) determines the overall state distribution for the data blocks that have already been coded and emitted and for the data block that is to be coded at that time. The data block that is to be coded at that time is assumed to have a state distribution as would result if the relevant data block were coded using the measure that could be used to code the data block such that the coded data would have the desired characteristics, or would have characteristics which were closer to the desired characteristics than would otherwise be the case. The state distribution that is determined in step K8 is referred to as the state distribution B in the following text.

If a number of different measures may be used to code the data block that is to be coded, such that the coded data has the desired characteristics or has characteristics that are close to the desired characteristics, the process of determining the state distribution, as conducted in step K8, is conducted for each of the possible measures. This possibly results in state distributions B, C, D, . . . in step K8.

In the next step (step K9), the control device CTRL checks which of the state distributions A, B, C, . . . determined in steps K7 and K8 most-closely approaches the reference state distribution.

If it is found during this check that the state distribution A that was determined in step K7 is the closest to the reference state distribution, the control device CTRL ensures the following:

that the data block that is to be coded is passed to the data conversion device DUE without being changed, and that, if the coding device has been appropriately configured in step K3, indication data that indicates that no data conversion has been conducted is integrated in the data that is to be emitted (step K10).

If it is found in the check that is carried out in step K9 that one of the state distributions B, C, D, . . . which were determined in step K8 comes closest to the reference state distribution, the control device CTRL ensures the following:

that the data conversion device DUE converts the data block that is to be coded using that measure whose use was assumed for the determination of the state distribution that is closest to the reference state distribution (step K11), and that, provided that the coding device was configured appropriately in step K3, indication data that indicates that the data conversion which was initiated in step K11 has been completed (step K12) is integrated into the data that is to be emitted.

After this, the transmitting device SEND emits the data block. The data block has been coded by the data conversion device and has been provided with the indication data by the transmitting device SEND (step K13).

A check is then conducted to determine whether there is a further data block to be transmitted (step K14). If this is the case, steps K6 to K14 are repeated. Otherwise, the coding process is ended (step K15).

A coding device such as this allows the data that is to be coded to be coded very differently. This will be explained in the following text with reference to a number of examples.

The first example relates to the conversion of a data stream to the FlexRay format.

In this case, a check bit must be inserted before each four data bits, in which case the check bit may optionally be a bit at a high level or a bit at a low level. In the example under consideration, it is assumed that the coded data is intended to have, if possible, precisely the same number of bits at the low level as bits at the high level.

The measures that allow a data stream to be converted to data having characteristics such as these include, in the example under consideration, the (payload) data that is actually to be transmitted being transmitted either without being changed or negated, with the check bits being used for indication data transmission.

In this case, the coding device is configured to produce the following:

the data stream that is to be coded is broken down into blocks which each have four bits, all the bits in the data blocks for which the state distribution is in each case determined are taken into account in each of the state distribution determination processes, the reference state distribution includes the difference between the number of bits at the high level and the number of bits at the low level in the coded data being as small as possible, such that the measures that are available in order to ensure that the coded data has the desired characteristics include the data that is to be coded being transferred without being changed, or being inverted bit-by-bit, indication data is inserted into the data that is to be transmitted, and the check bits are used as indication data.

As is known in the art, the data that is to be coded can thus be converted to data that has the desired characteristics or comes close to the desired characteristics.

The described coding device allows a data stream to be converted to data in the byteflight format, as well.

In this case, a bit at a low level must be inserted before each eight bits, and a bit at a high level must be inserted after these eight bits. In the example under consideration, there is no desire for the coded data to have a particular state distribution.

The measure that is used to convert a data stream to data that has the characteristics (specific additional bits at specific points within the coded data) includes insertion of the relevant data at the relevant points.

In this case, the coding device is configured to ensure the following:

that the data stream that is to be coded is broken down into data blocks that each have eight bits, that only the bits that are to be added or have been added are taken into account in each of the state distribution determination processes, that the reference state distribution includes as many 0-th bits (i.e., bits at the first location) at the low level and as many as 9-th bits (i.e., bits at the last location) at the high level as possible in the 10-bit blocks which are produced or are to be produced, that the measures which are available in order to ensure that the coded data has the desired characteristics include the bits which are to be added being added by the data conversion device DUE, and that no indication data is inserted into the emitted data.

In this way, it is also possible for the described coding device to insert additional bits into the data that is to be coded.

An appropriate configuration of the described coding device also allows this coding device to insert so-called stuffing bits into data that is to be transmitted via a CAN bus.

It should be obvious that the described coding device can also be used for any other desired codings of data that is to be coded.

To some extent, the way in which the described coding device conducts the respective coding operations is more complex than with a coding device that can carry out only a single coding operation. However, for this purpose, the coding device is able to carry out any desired Coding operations without any change to the fundamental procedure shown in FIG. 2.

The data that has been coded as described above can be decoded by the decoding device, which will be explained in more detail in the following text.

The described decoding device is distinguished in that it is able to decode differently coded data.

In this case, the measures that are used for decoding are defined as a function of the content and/or of the characteristics of the data that is to be decoded.

In the example under consideration, the content and the characteristics of the data that is to be coded are based on the indication data and/or the state distributions of the received data, or on selected parts of it.

These state distributions feature the following:

a state distribution that accounts for the data that has already been received by the decoding device, or of selected parts of it, a reference state distribution for the data that has been received by the decoding device, or of selected parts of it, and these are compared with one another, with the result of this comparison determining how the data that is to be decoded will be decoded.

Figure 3:
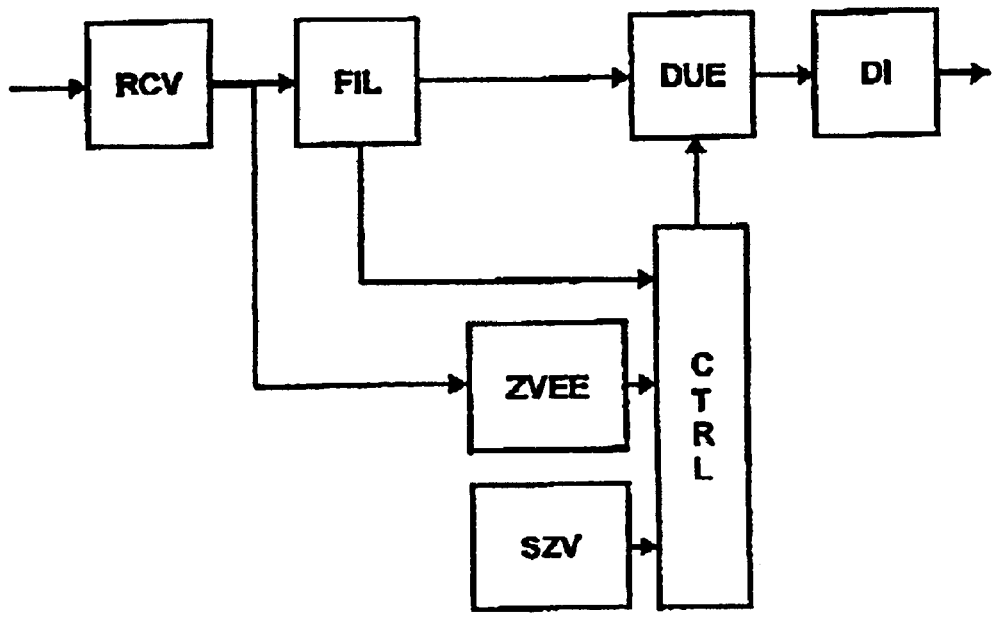
FIG. 3 is schematic, block diagram of a decoding device according to the invention.

FIG. 3 shows the construction of a decoding device such as this.

The decoding device that is shown in FIG. 3 contains a receiving device RCV, a filter FIL, a state distribution determination device ZVEE, a memory device SZV, a control device CTRL, a data conversion device DUE, and a data stream production device DSEE. The decoding device is able to conduct the following steps:

the receiving device RCV receives the data that is to be decoded, to be more precise the data blocks produced by and emitted from the coding device, and passes this data to the filter FIL and to the state distribution determination device ZVEE, the filter FIL filters the indication data from the data blocks (the indication data was inserted by the coding device and indicates how the data has been coded) and passes this indication data to the control device CTRL, and passes the data blocks to the data conversion device DUE, the state distribution determination device ZVEE determines the state distribution (i.e., the number of bits at the high level and the number of bits at the low level) for the received data, or for selected parts of it, and passes this state distribution to the control device CTRL, the memory device SZV stores a reference state distribution that is entered via an input device that is not shown in FIG. 3, or a reference state distribution that is determined from data that is entered via the input device, and passes this reference state distribution to the control device CTRL, based on the information that is supplied to it, the control device CTRL defines the measures to be used to decode the data and drives the data conversion device DUE appropriately, and the data stream production device DSEE assembles the data that has been decoded packet-by-packet to form a continuous data stream, which it emits.

Figure 4:
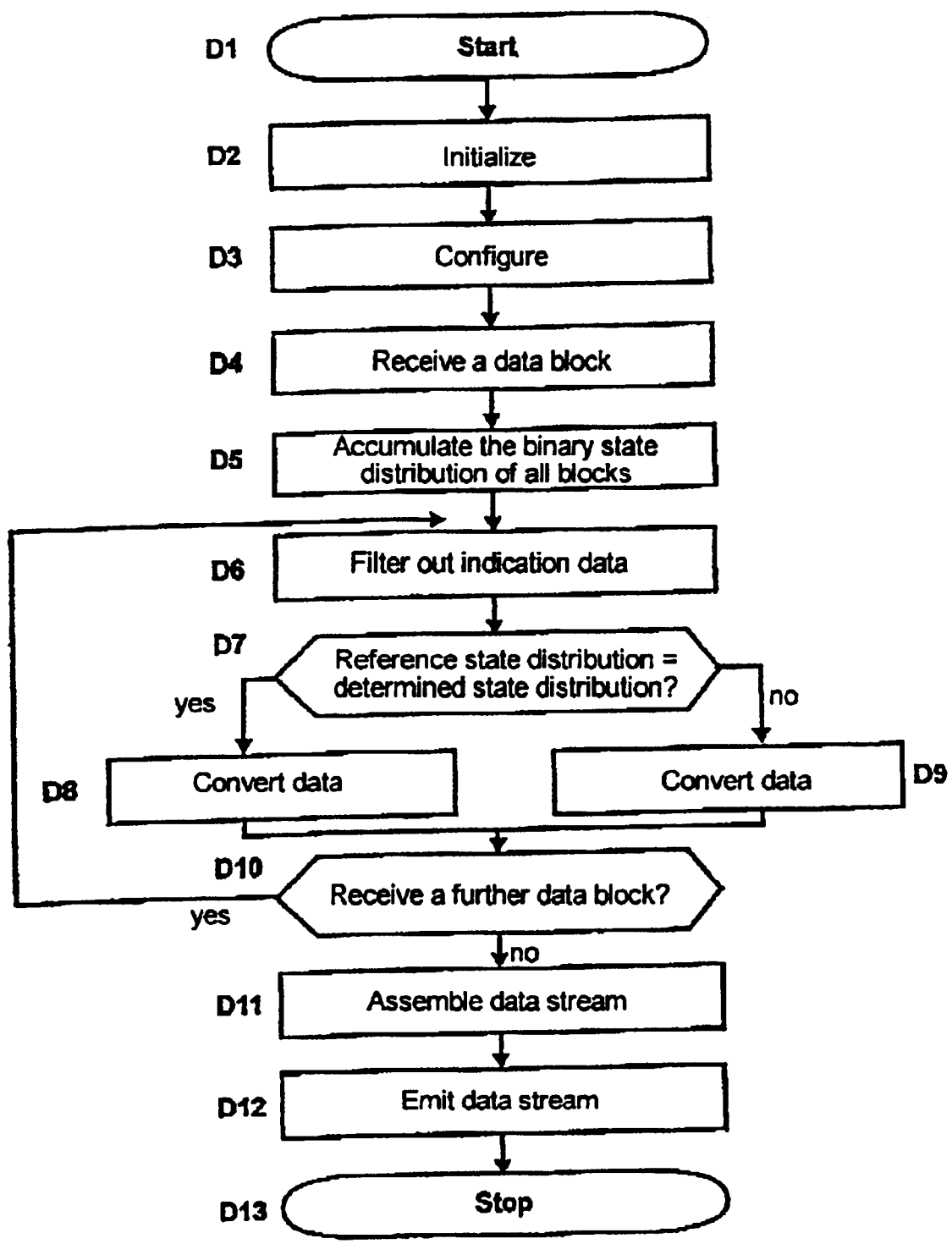
FIG. 4 is a flowchart showing a method of operating the decoding device shown in FIG. 3.

The decoding device shown in FIG. 3 operates according to the flowchart shown in FIG. 4.

After the start (i.e., after the initial startup or after resetting of the decoding device (step D1)), the decoding device is initialized (step D2).

Data that is used for configuration of the decoding device is then entered (step D3). In the example under consideration, this data includes the following information:

whether, and possibly for which parts of the received data, a state distribution is intended to be determined, the reference state distribution, whether the received data contains indication data, and, if appropriate, where such data is located, and how the control device CTRL must drive the data conversion device DUE, based on the reference state distribution, the actual state distribution, and/or the indication data.

After this (step D4), the decoding device can receive data that is to be decoded: to be more precise, a data block that is to be decoded.

Once the receiving device RCV has received a data block, and depending on the configuration carried out in step D3, the following steps can be performed:

the state distribution determination device ZVEE determines the required state distribution (step D5), and/or the filter FIL filters the indication data out of the received data block (step D6).

With regard to step D5, it should be noted that the process of determining the state distribution can optionally be based solely on the data block being received at that time or on selected parts of it, or "only" on the previously received data blocks or selected parts of them, or on all the previously received data blocks or selected parts of them.

A comparison is then carried out (step D7) between the reference state distribution and the actual state distribution.

Depending on the result of this comparison, the measures that will be used by the data conversion device DUE to decode the data block are then defined by the control device, (steps D8 and D9), additionally or solely taking into account the reference state distribution, the actual state distribution and/or the indication data. The control device CTRL drives the data conversion device DUE appropriately, and the latter decodes the data block appropriately.

The decoding device then (step D10) checks whether there is a further data block to be received.

If this is the case, the process jumps back to step D4. Otherwise, the data stream production device DSEE assembles the decoded data blocks to form a continuous data stream (step D11), and emits this continuous data stream (step D12).

A decoding device such as this allows a large number of differently coded data items that are to be decoded.

When FlexRay data is being decoded, this is done by extracting the indication data contained in it and by defining how the data is to be decoded solely as a function of this indication data (irrespective of the result of the comparison conducted in step D7).

Instead of this, it would also be possible to use state distributions that take into account only the indication data, and then to define how the data is to be decoded as a function of the result of the comparison completed in step D7.

When decoding byteflight data, it is possible to state, irrespective of the indication data and irrespective of the result of the comparison carried out in step D7, that the respective 0-th and the respective 9-th bit must be removed from each data block. If state distributions are nevertheless determined, and are compared with the reference state distribution, even though the result of the comparison carried out in step D7 is not required in order to define the decoding process, it is possible to state whether the (0-th and 9-th) bits which were inserted by the coding device have the predetermined values and, if appropriate, an alarm message can be emitted.

CAN data may be decoded by using the state distributions to check whether the received data contains any stuffing bits, and by using the comparison that is carried out in step D7 to determine whether there is any stuffing bit that needs to be removed.

The data that is coded in any desired manner can be decoded by appropriate configuration of the decoding device.

The way in which the described decoding device conducts the respective decoding processes is in some cases more complex than is the case with a decoding device that can conduct only the one specific decoding operation. However, the decoding device is able to conduct any desired decoding processes for this purpose.

The described coding device and the described decoding device can also be used for widely differing applications; these are coding and decoding devices that have a simple construction and can be used universally.

I claim:

1. A coding device for coding data, comprising means for converting data to be coded into a given one of different possible sets of coded data, and means for varying the characteristics of the coded data, each set of coded data having different characteristics.

2. The coding device according to claim 1, further comprising means for determining measures for coding the data based on the characteristics of the coded data.

3. The coding device according to claim 1, further comprising means for getting a protocol for transmitting the coded data.

4. The coding device according to claim 1, further comprising means for maximizing a number of level changes in the coded data.

5. The coding device according to claim 1, further comprising means for minimizing a number of level changes in the coded data.

6. The ceding device according to claim 1, further comprising means for wetting a specific number of level changes per unit time in the coded data.

7. The coding device according to claim 1, further comprising means for setting a ratio of a number of bits at a high level in the coded data to & number of bits at a low level in the coded data.

8. The coding device according to claim 1, further comprising means for limiting a number of bits at a high level in the coded data.

9. The coding device according to claim 1, further comprising means for limiting a number of bite at a low level in the coded data.

10. The coding device according to claim 1, further comprising means for inserting bits at specific levels at specific points in the coded data.

11. The coding device according to claim 1, further comprising moans for selecting bits or bit sequences in the coded data to contain the characteristics.

12. The coding device according to claim 1, further comprising means fox varying measures fox coding the data to be coded.

13. The coding device according to claim 12, wherein the measures include inserting additional bits inserted into the data to be coded.

14. The coding device according to claim 12, further comprising means for emitting information about the measures.

15. The coding device according to claim 14, wherein said means for emitting information about the measures integrates in the coded data the information about the measures.

16. The coding device according to claim 12, wherein the measures include subjecting the data to be coded to operations selected from the group consisting of logical operations and arithmetic operations.

17. The coding device according claim 12, wherein the measures include emitting the data to be coded without being changed.

18. The coding device according to claim 12, further comprising means for choosing at least one of the measures for coding the data to be coded based on the coded data matching desired characteristics as closely as possible.

19. The coding device according to claim 18, wherein the means for choosing at least one of the measures simultaneously considers both already-emitted coded data and the data to be coded.

20. The coding device according to claim 19, wherein said means for choosing at least one of the measures considers at least one of a state distribution counting bite at a high level and bits at a low level within the already-emitted coded data and a state distribution counting bits at a high level and bits at a low level within the data to be coded.

21. The coding device according to claim 19, wherein said means for choosing at least one of the measures considers state distributions, the state distributions counting bits at a high level end bits at a low level within the already-emitted coded data and the data to be coded.

22. The ceding device according to claim 20, wherein the state distributions include a state distribution of the already-emitted coded data and would-be-coded data that would be emitted if the data to be coded were coded using one of the measures.

23. The coding device according to claim 20, wherein the state distributions include a state distribution of the already-emitted data and would-be-coded data that would be emitted if selected parts of the data to be coded were coded using one of the measures.

24. The coding device according to claim 20, wherein said means for choosing at least one of the measures compares the state distributions.

25. The coding device according to claim 24, wherein said means for choosing at least one of the measures compares the state distributions with a reference state distribution.

26. The coding device according to claim 20, wherein said means for choosing at least one of the measures compares the state distributions with a reference state distribution.

27. The coding device according to claim 18, wherein said means for choosing at least one of the measures exclusively considers already-emitted coded data.

28. The coding device according to claim 18, wherein said means for choosing at least one of the measures exclusively considers the data to be coded.

29. The coding device according to claim 12, wherein the measures include setting selected bits set to one of a high level and a low level.

30. The coding device according to claim 1, further comprising means for subdividing the data to be coded into data blocks, and said means for converting data codes each of the data blocks.

31. The coding device according to claim 30, wherein said means for converting data can code the data blocks independently of one another by using possibly different measures.

32. A coding device for coding data, comprising:
a data block production device for receiving data;
a data conversion device connected to said data block production device;
a first state distribution determination device connected to said data block production device;
a memory device;
a control device connected to said first state distribution device, said memory device, and said data conversion device;
a transmitting device for transmitting coded data connected to said data conversion device and said control device; and
a second state distribution determination device interconnecting said transmitting device and said control device.

33. A decoding device for decoding data, comprising means for decoding data to be decoded and differently coded data, the data to be decoded carrying state distributions enumerating bits at a high level and bits at a low level, said means decoding the data based on the state distributions.

34. The decoding device according to claim 33, wherein said means for decoding derives measures used for decoding from data to be decoded.

35. The decoding device according to claim 33, wherein said means for decoding derives measures used for decoding from characteristics of data to be decoded.

36. The decoding device according to one of claim 33, wherein said means for decoding derive, measures for decoding by comparing the state distributions.

37. The decoding device according to claim 33, wherein the state distributions include a state distribution of already-received data.

38. The decoding device according to claim 33, wherein the state distributions include a state distribution of a part of already-received data.

39. The decoding device according to claim 33, wherein the state distributions include a reference state distribution.

40. The decoding device according to claim 33, wherein said means for decoding decodes the data to be decoded based on information contained in the data to be decoded.

41. The decoding device according to claim 40, wherein the information identifies measures used to code the data to be decoded.

42. A decoder for decoding coded signals, comprising:
a receiving device;
a filter connected to said receiving device;
a first state distribution determination device connected to said receiving device;
a memory device;
a control device connected to said first state distribution determination device, maid filter, and said memory device;
a data conversion device connected to said filter and said control device, and
a data stream production device connected to said data conversion device.

43. A method for coding data, which comprises converting data to be coded into coded data having characteristics by using a coder, the coder being capable of coding data into various different sets of coded data each having different characteristics, and varying the characteristics of the coded data.

44. A method for decoding coded data, which comprises converting coded data having characteristics into a data stream by using a decoder, the decoder being capable of decoding various sets of coded data each having different characteristics, and decoding the coded data based on state distributions carried by the coded data.

* * * * *

UNITED STATES PATENT AND TRADEMARK OFFICE
CERTIFICATE OF CORRECTION

PATENT NO. : 6,756,920 B2  
DATED : June 29, 2004  
INVENTOR(S) : Wilhard Christophorus Von Wendorff Page 1 of 1

It is certified that error appears in the above-identified patent and that said Letters Patent is hereby corrected as shown below:

Column 9,  
Line 55, should read -- prising means for setting a protocol for transmitting the coded data --.  
Line 64, should read -- prising means for setting a specific number of level changes --.

Column 10,  
Line 1, should read -- level in the coded data to a number of bits at a low level in --.  
Line 7, should read -- level in the coded data to a number of bits at a low level in --.  
Line 13, should read -- comprising means for selecting bits or bit sequences in the --.  
Line 16, should read -- comprising means for varying measures for coding the data --.  
Line 43, should read -- least one of a state distribution counting bits at a high level --.  
Line 50, should read -- high level and bits at a low level within the already-emitted --.  
Line 52, should read -- The coding device according to claim 19, wherein the --.

Column 12,  
Lines 2-4, should be deleted.  
Line 25, should read -- determination device, said filter, and said memory --.

Signed and Sealed this

Fourteenth Day of March, 2006

JON W. DUDAS  
*Director of the United States Patent and Trademark Office*

UNITED STATES PATENT AND TRADEMARK OFFICE
CERTIFICATE OF CORRECTION

PATENT NO. : 6,756,920 B2
APPLICATION NO. : 10/194901
DATED : June 29, 2004
INVENTOR(S) : Wilhard Christophorus Von Wendorff It is certified that error appears in the above-identified patent and that said Letters Patent is hereby corrected as shown below:

<u>Column 9,</u>

Line 55, should read -- prising means for setting a protocol for transmitting the --.

<u>Column 10,</u>

Line 7, should read -- prising means for limiting a number of bits at a low level in --.
Line 52, should read --22. The coding device according to claim 20, wherein the --.

<u>Column 12,</u>

Line 2, should read -- wherein said means for decoding derives measures for --.
Line 25, should read -- said receiving device; --
Line 28, should read -- determination device, said filter, and said memory --.

Signed and Sealed this

Seventeenth Day of October, 2006

JON W. DUDAS
*Director of the United States Patent and Trademark Office*